United States Patent [19]

Schmissrauter

[11] Patent Number: 5,356,071
[45] Date of Patent: Oct. 18, 1994

[54] BIODEGRADABLE DISPLAY CARTON AND METHOD OF MAKING SAME

[75] Inventor: Mark M. Schmissrauter, Signal Mountain, Tenn.

[73] Assignee: Textile Printing Company, Chattanooga, Tenn.

[21] Appl. No.: 127,878

[22] Filed: Sep. 28, 1993

[51] Int. Cl.⁵ .............................................. B65D 5/20
[52] U.S. Cl. .................................. 229/160; 229/171; 229/162
[58] Field of Search ............... 229/169, 162, 172, 171, 229/160

[56] References Cited

U.S. PATENT DOCUMENTS

| | | | |
|---|---|---|---|
| 1,923,065 | 8/1933 | Clemens | 206/45.31 |
| 2,577,109 | 12/1951 | Cranshaw | 229/171 X |
| 2,637,482 | 5/1953 | Broderick | 229/30 |
| 2,679,926 | 6/1954 | Dubin | 206/45.31 |
| 3,311,285 | 3/1967 | Korr | 229/172 X |
| 3,487,915 | 1/1970 | Scott | 206/16 |
| 4,106,615 | 8/1978 | Hiroshi | 206/45.31 |
| 4,196,563 | 4/1980 | Gabrielson et al. | 53/456 |
| 4,241,863 | 12/1980 | Faller | 229/169 X |
| 4,267,956 | 5/1981 | House et al. | 229/169 X |
| 4,312,451 | 1/1982 | Forbes, Jr. | 229/169 X |
| 4,361,265 | 11/1982 | Benham | 229/169 X |
| 4,365,714 | 12/1982 | Doyel | 206/461 |
| 4,836,439 | 6/1989 | Hart | 229/169 X |
| 4,901,911 | 2/1990 | Drexhage | 229/169 X |

Primary Examiner—Allan N. Shoap
Assistant Examiner—Christopher McDonald
Attorney, Agent, or Firm—Brady, O'Boyle & Gates

[57] ABSTRACT

A biodegradable display carton wherein a one-piece paper blank is cut, scored, and folded to form a container portion for displaying a product. The container portion has an outwardly extending flange portion extending around the upper peripheral edge of the container portion and an integral cover is hingedly connected to an edge of the peripheral flange, so that to close and seal the container, the cover is folded over and adhesively secured to the peripheral flange. An open window area is provided in the cover and a retainer extends across the window to hold the product in the container.

5 Claims, 11 Drawing Sheets

BIODEGRADABLE DISPLAY CARTON AND METHOD OF MAKING SAME

BACKGROUND OF THE INVENTION

Various cartons have been proposed for displaying a product packaged therein.

One such display carton is known as the "bubble" or "blister" package, wherein a plastic "bubble" or "blister" is adhesively secured to a paper backing for enclosing the product to be displayed. A disadvantage in this type of display carton resides in the requirement of two components; viz, the plastic bubble and the paper backing, which have to be conveyed separately to a packing filling station where they are mated, aligned and then adhesively secured together. Another disadvantage in this type of display carton is that it is not biodegradable because of the use of the plastic bubble.

Other types of display cartons have included a single piece of cardboard, cut and scored, so that the cardboard can be folded and adhesively secured to form a carton having a cellophane covered display window. Once again, these types of display cartons are not biodegradable because of the use of cellophane to cover the display window.

After considerable research and experimentation, the one-piece display carton of the present invention has been devised which employs no plastic, and therefore, is biodegradable.

SUMMARY OF THE INVENTION

The biodegradable display carton of the present invention comprises, essentially, a one-piece paper blank, cut, scored and folded to form a product container portion having an outwardly extending flange portion extending around the upper peripheral edge of the container portion upon which an integral cover is adhesively secured.

The cover is provided with a window area having a retainer extending thereacross for holding the product being displayed in the container portion of the carton.

By this construction and arrangement, the display carton is completely biodegradable.

DESCRIPTION OF THE PREFERRED EMBODIMENT

Figure 5:
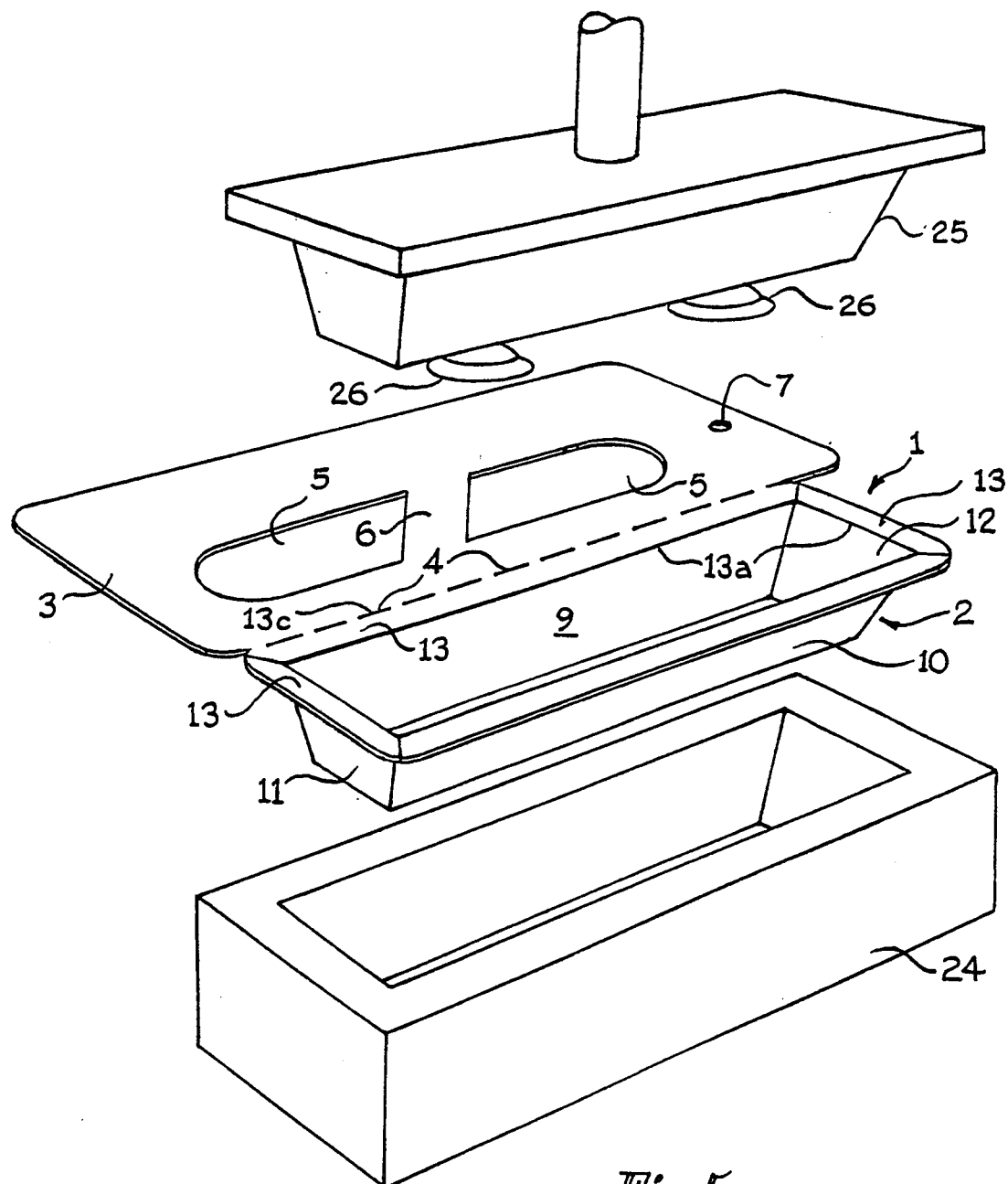
FIG. 5 is a perspective view of the mandrel and mold employed for folding the one-piece die cut blank of FIG. 4 to form a product containing portion and an integral cover hingedly connected thereto.
Figure 11:
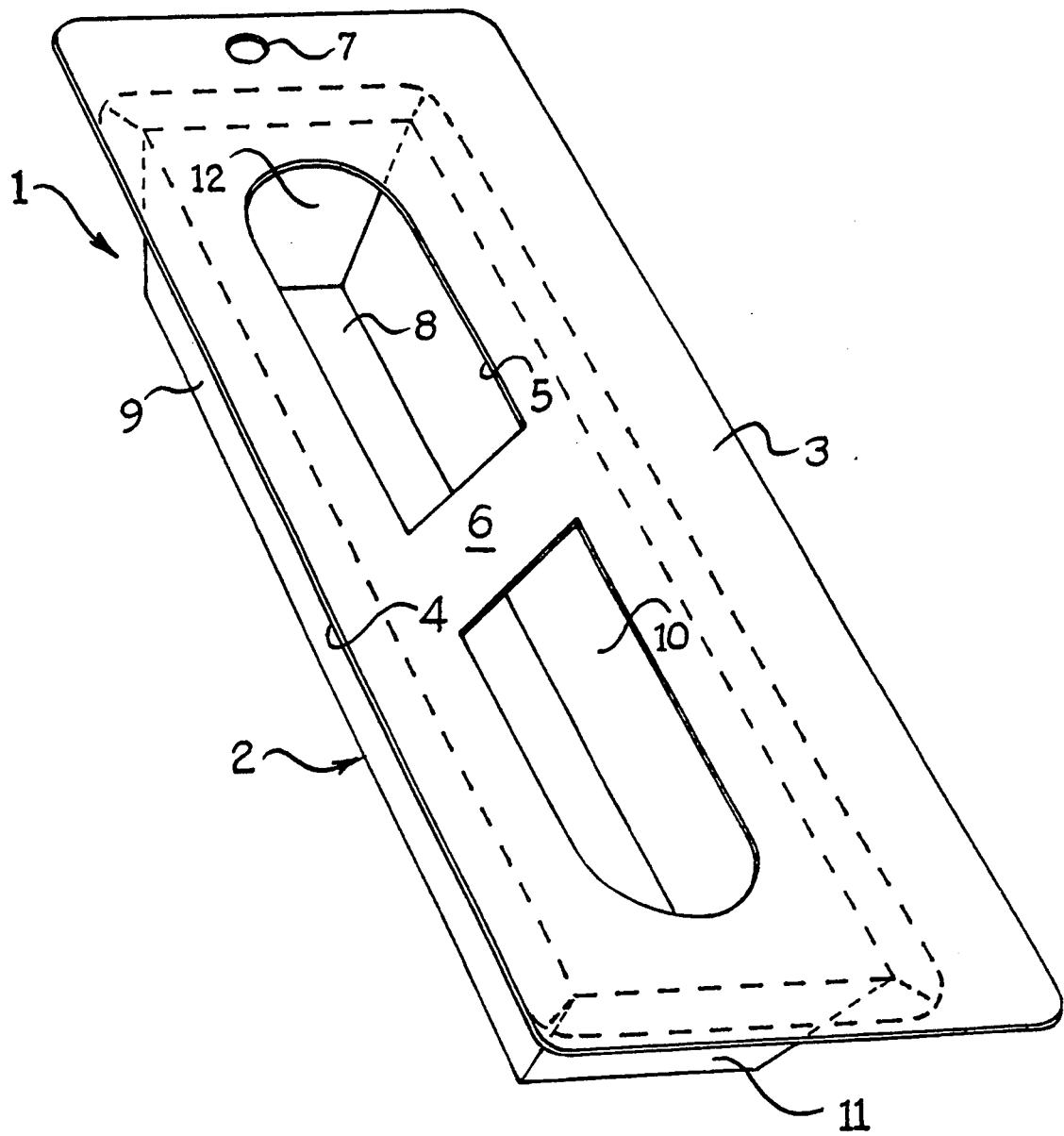
FIG. 11 is a perspective view of the one-piece biodegradable display carton of the present invention.

Referring to the drawings in greater detail, and more particularly to FIGS. 5 and 11, the biodegradable display carton 1 of the present invention comprises a product containing portion or tray 2, and an integral cover portion 3 hingedly connected to the tray as at 4. The cover portion 3 is provided with an open display window 5 having a retainer 6 extending across the window 5 for holding a packaging product in the tray 2. A hole 7 is provided on the cover portion 3 at one of the cover portion 3, whereby the display carton 1 can be suspended from a suitable display rack (not shown).

The tray portion 2 comprises a bottom wall 8, a pair of side walls 9 and 10, and end walls 11 and 12.

An outwardly extending peripheral flange 13 is integral with the upper edges of the side and end walls of the tray to which the cover portion 3 is adhesively secured.

Figure 1:
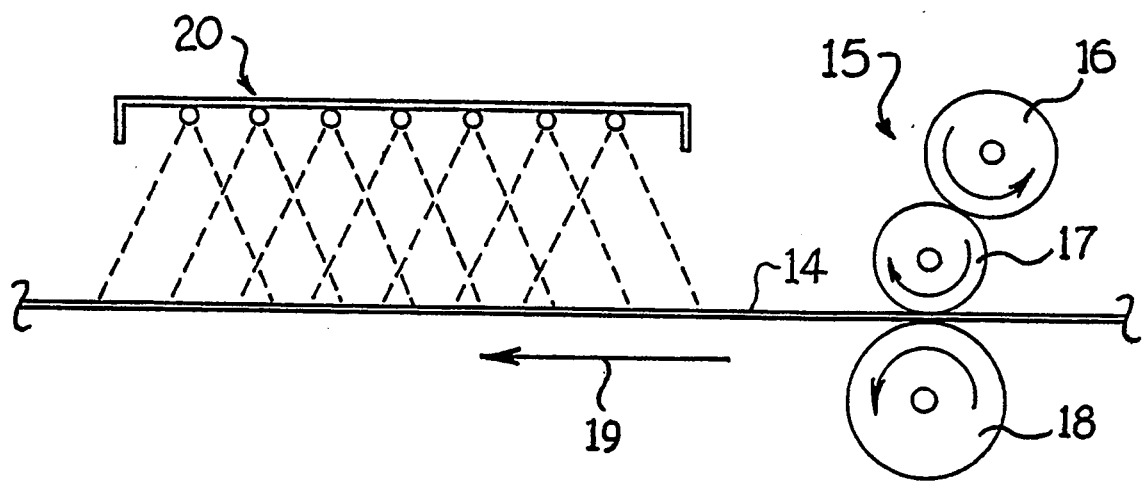
FIG. 1 is a diagrammatic view of a printed paperboard sheet having a coating of adhesive applied to the upper surface thereof and then dried.

The method of making the display carton 1 as shown in FIG. 11, is illustrated in FIGS. 1 to 10, wherein it will be seen, in FIG. 1, that a printed paperboard sheet 14, having its printed face down, is fed through an adhesive applicator 15 wherein an adhesive coating is applied to the upper face of the sheet 14. The adhesive coating is preferably water solvable and biodegradable. The adhesive applicator 15 includes a metering roller 16, an applicator roller 17 and an impression roller 18. The adhesive coated paperboard sheet 14 then travels in the direction of the arrow 19 under a plurality of heaters 20 such as infrared lights, whereby the adhesive is dried and cured.

Figure 2:
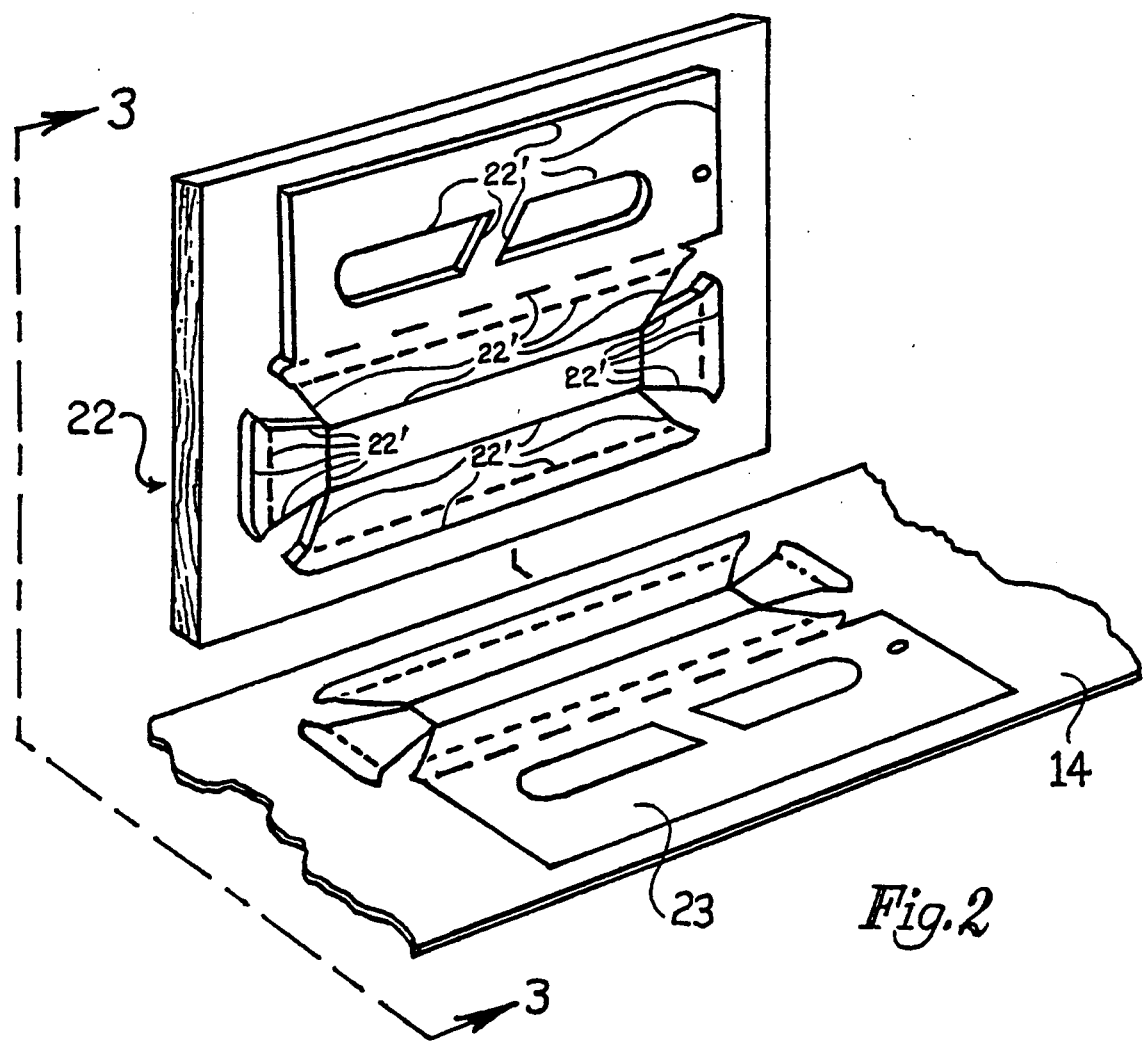
FIG. 2 is a fragmentary, perspective view of a one-piece paperboard blank cut and scored from the paperboard sheet of FIG. 1, and the die employed for cutting the paperboard sheet to form the blank.
Figure 3:
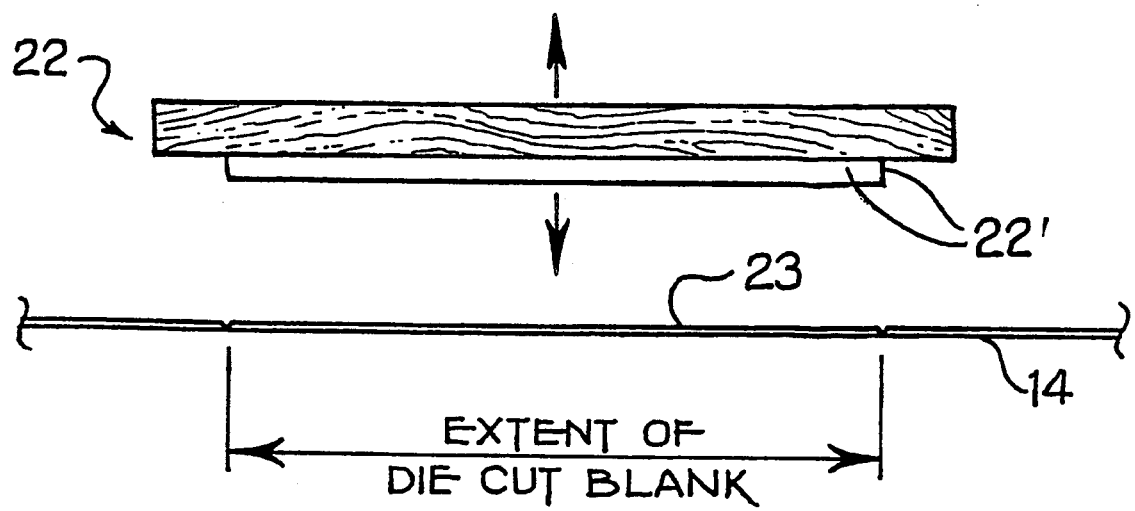
FIG. 3 is view taken along lines 3—3 of FIG. 2, showing the die in its operative position.

The adhesive coated sheet 14 is then conveyed on a conveyor to a die cut station as shown in FIGS. 2 and 3, with the adhesive coated side face down and a die 22, having suitably configured blades 22' to cut and score, is employed for cutting a one-piece blank 23 from sheet 14 on the conveyor.

Figure 4:
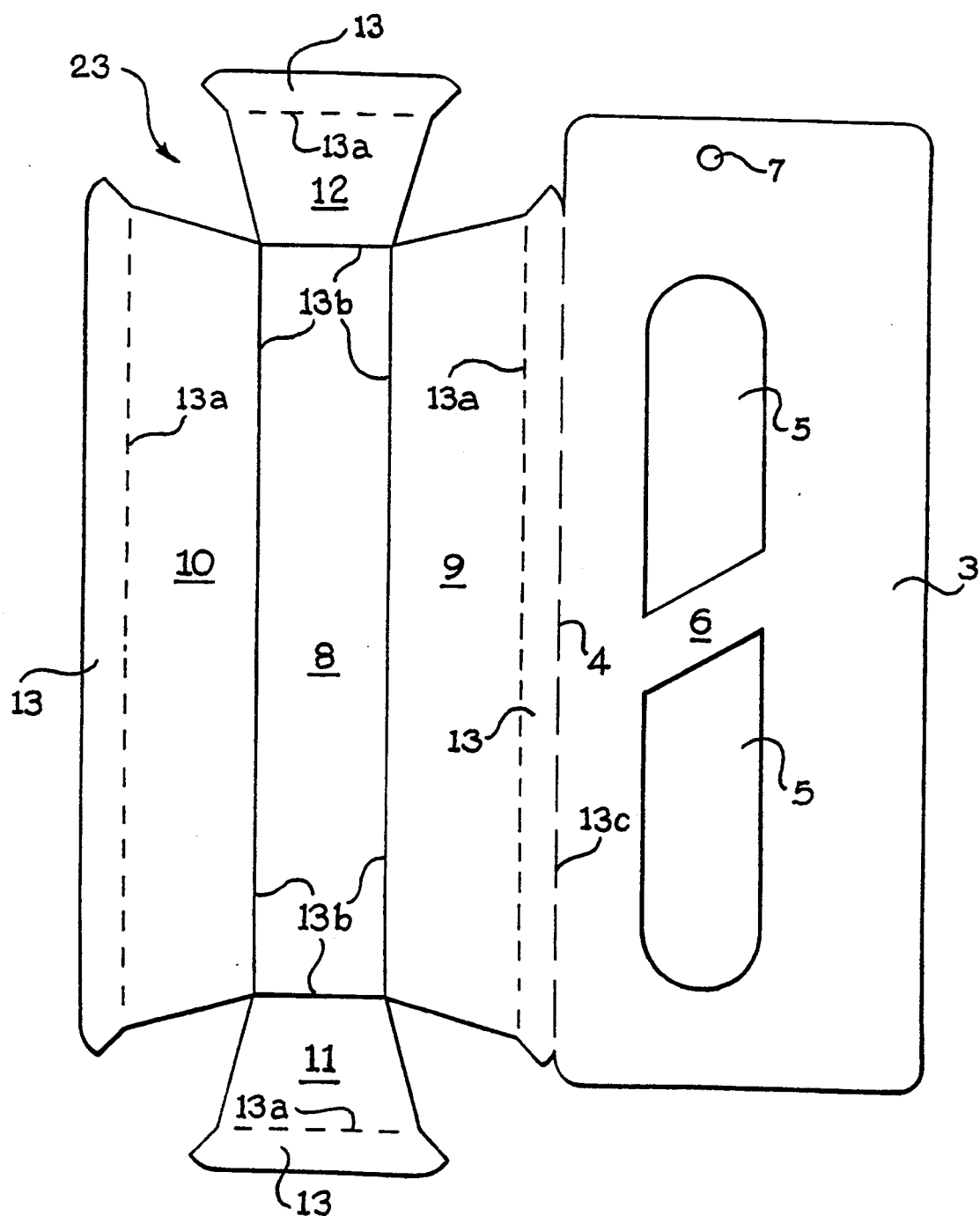
FIG. 4 is a plan view of the one-piece, cut and scored paperboard blank.

As will be seen in FIG. 4, the die cut blank 23, scored at 13a, 13b and 13c, is formed with flaps which, when folded on score lines 13b, provide the bottom wall 8, side walls 9, 10, and end walls 11, 12 of the tray 2, and when folded on score line 13c, which comprises the hinge connection 4, provides the cover 3. The blank score lines at 13a provide fold lines for forming the peripheral flange portions 13 of the tray 2.

Figure 6:
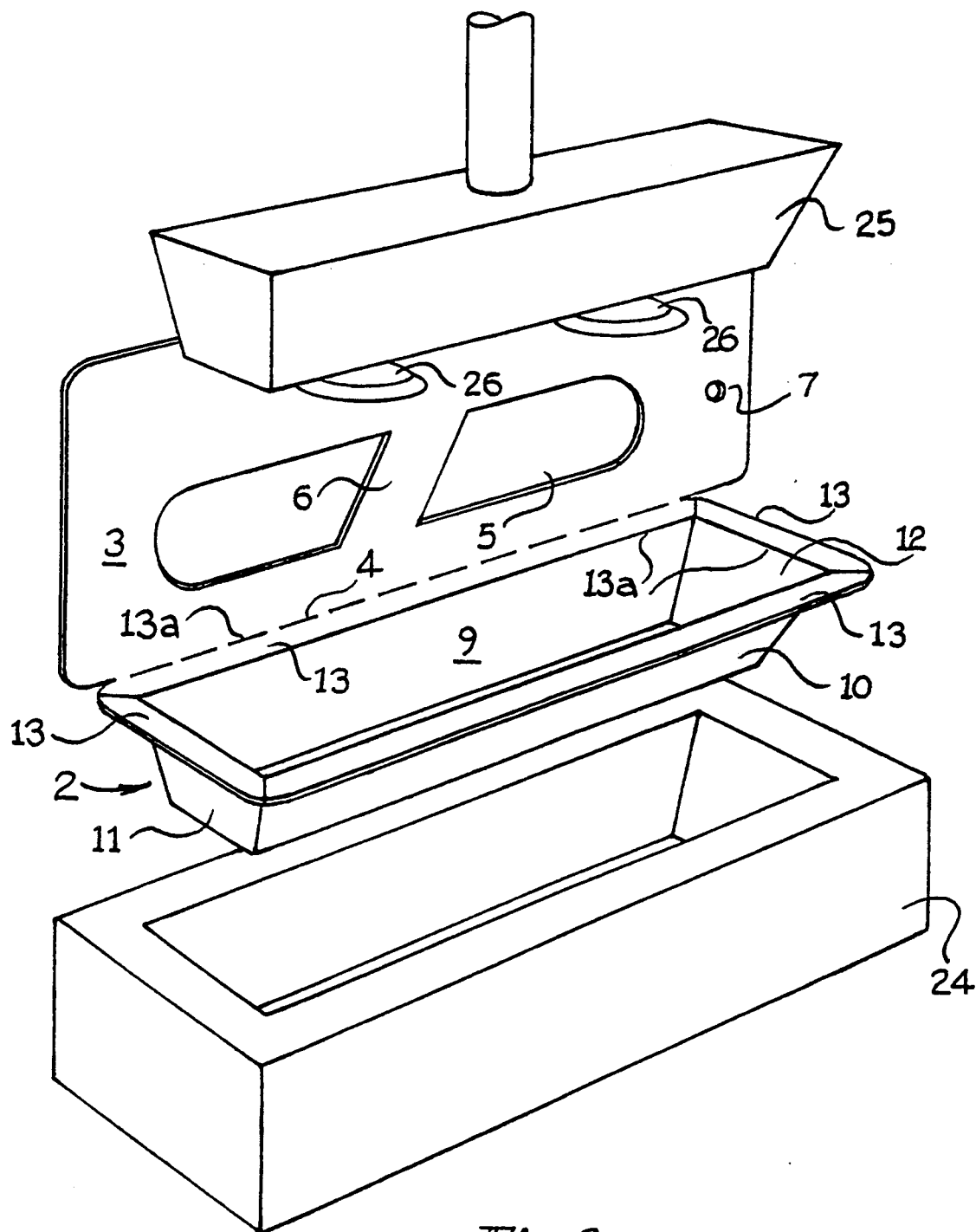
FIG. 6 is a view similar to FIG. 5, but showing the cover folded upwardly during the forming of the product containing portion.
Figure 7:
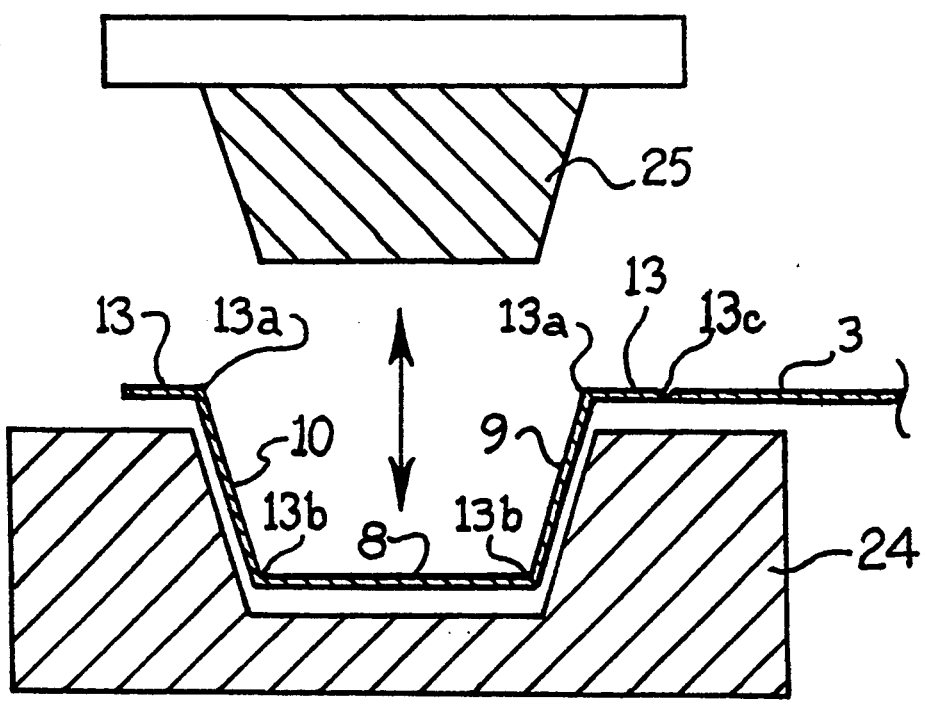
FIG. 7 is an end elevational view, in section, showing the mold, paperboard blank and mandrel as shown in FIG. 5.

The one-piece blank 23 is then conveyed to a folding station as shown in FIGS. 5 to 7, wherein the tray portion of the blank is pressed into a suitably configured mold 24 by a mandrel 25, whereby the one-piece blank flaps are folded upwardly on score lines 13b to form the side walls 9, 10 and end walls 11 and 12, and the edge portions of the flaps of the tray are folded outwardly on score lines 13a to form the peripheral flange portions 13 forming the peripheral flange 13. During the folding operation the cover portion 3 may remain in a horizontal position relative to the tray 2, as shown in FIGS. 5 and 7, or simultaneously folded upwardly on score line 13c to a vertical position relative to the tray as shown in FIG. 6. The mandrel 25 is provided with releasable suction gripples 26, or other air suction means, to facilitate the removal of the folded blank from the mold 24.

Figure 8:
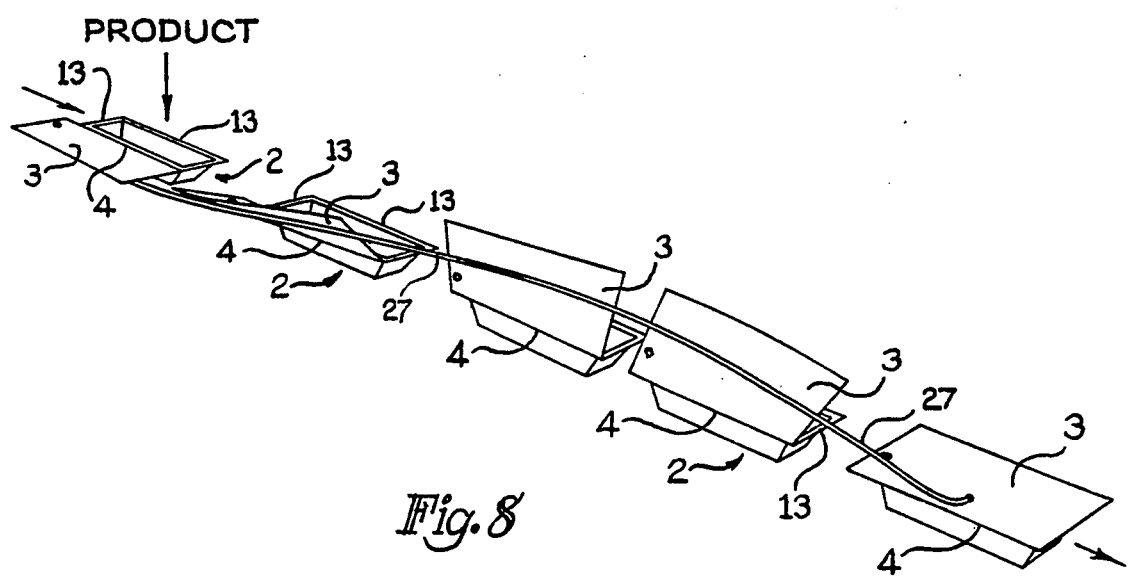
FIG. 8 is a diagrammatic view showing the cover of the display carton being folded over the product containing portion.

The folded blank is then conveyed to a product loading and cover folding station as diagrammatically shown in FIG. 8, wherein the tray 2 having the cover portion 3 in the fully open horizontal position is in a first position wherein the product to be packaged is deposited within the tray 2. The tray may be in a carrier member, not shown, on the conveyor, similar to the mold 24, to maintain the tray 2 in formed position during the product loading and cover folding steps. The product carrying tray 2 is then conveyed passed a curved guide rod 27 which engages the cover portion 3 to thereby progressively fold the cover portion 3 on hinge connection 4, score line 13c, over the tray 2 until the adhesive-coated surface of cover portion 3 abuts the adhesive coated surface of the peripheral flange portions 13.

Figure 9:
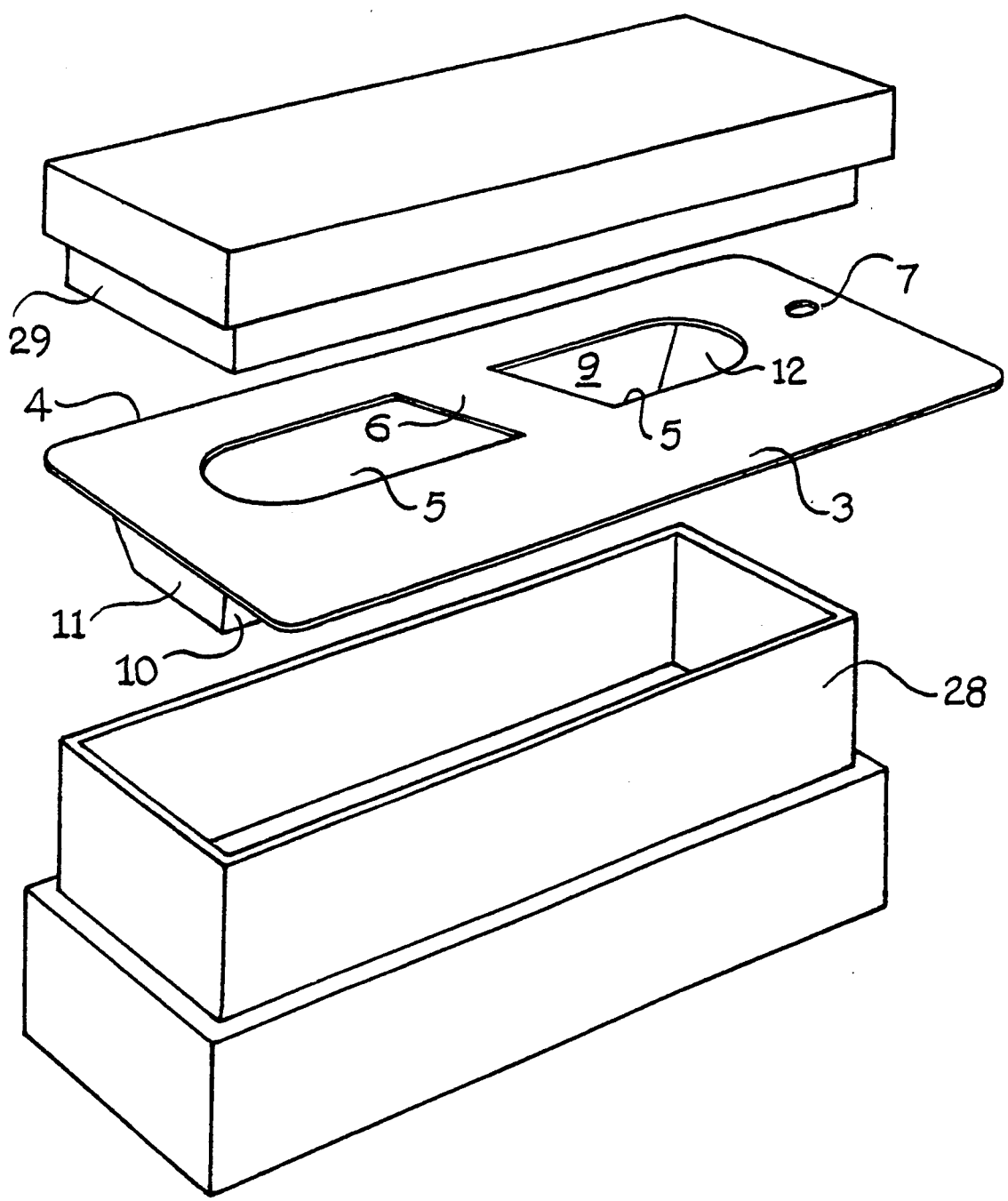
FIG. 9 is a perspective view of the sealer for heat sealing the cover to the container portion.
Figure 10:
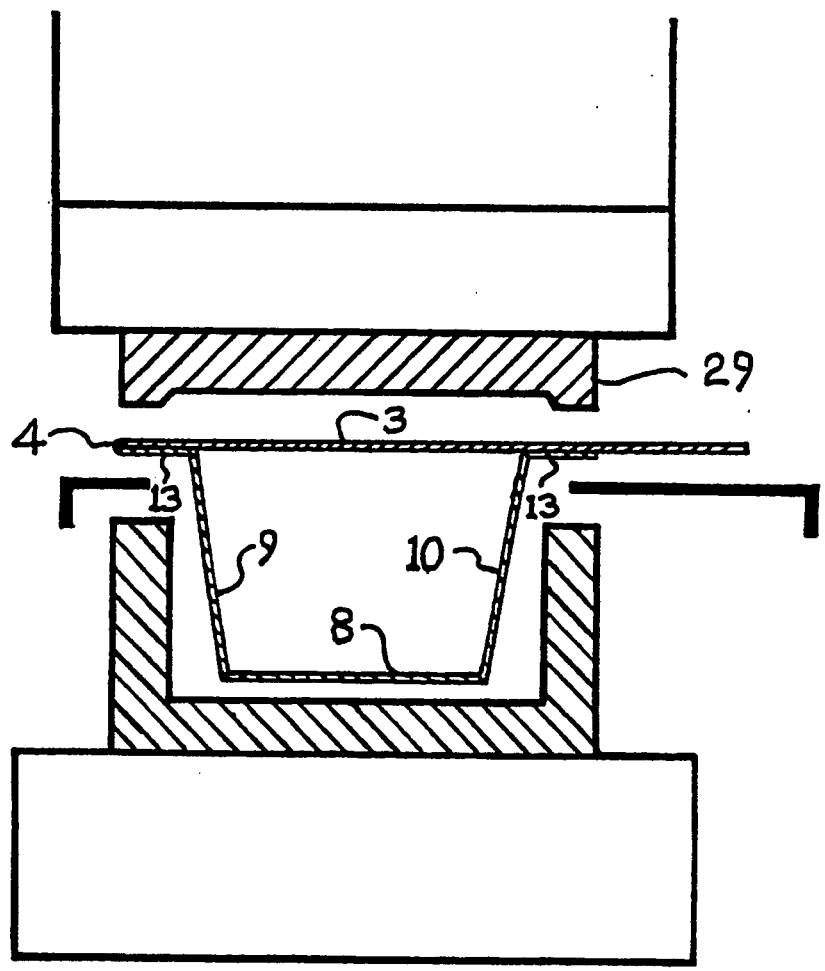
FIG. 10 is an end elevational view, in section, of the sealer and folded carton being sealed.

The covered display carton 1 containing the product is then conveyed to a sealing station as shown in FIGS. 9 and 10, wherein the tray 2 in the carrier, not shown, is moved beneath a sealing platen 29, or is placed in a receptacle 28 beneath the sealing platen 29. The sealing platen 29 may be a heated platen or a radio frequency operated platen to activate the adhesive coating. The platen 29 presses the cover 3 against the peripheral flange portions 13 of the tray 2, thereby applying heat or radio frequency energy and pressure thereto, to activate the adhesive coatings and to seal the abutting adhesive faces of the cover and peripheral flange portions 13 of the tray 2, whereby the display package 1, as shown in FIG. 11, with the product packaged therein, is provided.

It should be noted that during the sealing of the carton 1, the abutting edges forming the corners of the tray 2 are not adhesively secured together so that the holding of the tray 2 in the erected position is accomplished by the sealed abutting adhesive faces of the cover portion 3 and peripheral flange portions 13 on side walls 9 and 10, and end walls 11 and 12. Peripheral flange portions 13 thus surround the tray 2 and seal all four sides of the tray to the cover portion and hanger portion 3, even on the side adjacent hinge connection 4, to provide the necessary stability to the filled carton.

It should be further noted that the open window 5 of the cover portion is not covered with any transparent material such as plastic or cellophane, thereby rendering the display carton completely biodegradable. In lieu of a cover to the window 5, the retainer 6 is provided for holding the product in the tray 2 of the carton. A plurality of retainers 6 may be formed across the window area, depending on the size of the product to be retained in the carton.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A biodegradable display carton comprising, a one-piece paper blank, cut, scored and folded to form a container portion having a bottom wall, opposite end walls, and opposite side walls, an outwardly extending flange portion integral with the upper edge of said end walls and said side walls, a substantially planar cover hingedly connected to the outer edge of said flange portion along a selected one of said side and end walls of said container portion, said planar cover being folded over on the hinged connection upon said flange portion to which it is hingedly connected and adhesively secured in overlying relation thereto and to the other flange portions on the remaining side and end walls.

2. A biodegradable display carton according to claim 1, wherein the cover is hingedly connected to the outer edge of the flange portion along one side of said container portion.

3. A biodegradable display carton according to claim 2, in which said substantially planar cover extends laterally beyond said flange portion along the side of said container portion opposite said flange portion hingedly connected to said planar cover, and extending longitudinally beyond the flange portion on at least one of said end walls.

4. A biodegradable display carton according to claim 1, wherein a window area is provided in the cover for displaying a product in the container.

5. A biodegradable display carton according to claim 4, wherein the window area is open, and a retainer extends across the window area for retaining the product in the container.

* * * * *